US010027123B2

(12) United States Patent
Fawzy et al.

(10) Patent No.: US 10,027,123 B2
(45) Date of Patent: Jul. 17, 2018

(54) CONTROL OF A PLURALITY OF INVERTERS CONNECTED TO A COMMON GRID CONNECTION POINT

(71) Applicant: SMA Solar Technology AG, Niestetal (DE)

(72) Inventors: Yehia Tarek Fawzy, Kassel (DE); Daniel Premm, Kaufungen (DE); Vitali Sakschewski, Fuldabrueck (DE); Stijn Stevens, Nieste (DE); Christian Tschendel, Kassel (DE)

(73) Assignee: SMA Solar Technology AG, Niestetal (DE)

(*) Notice: Subject to any disclaimer, the term of this patent is extended or adjusted under 35 U.S.C. 154(b) by 597 days.

(21) Appl. No.: 14/571,481

(22) Filed: Dec. 16, 2014

(65) Prior Publication Data

US 2015/0115722 A1     Apr. 30, 2015

Related U.S. Application Data

(63) Continuation of application No. PCT/EP2013/062760, filed on Jun. 19, 2013.

(30) Foreign Application Priority Data

Jun. 28, 2012   (DE) .................. 10 2012 105 721

(51) Int. Cl.
*H02J 1/00*      (2006.01)
*H02J 3/38*      (2006.01)
(Continued)

(52) U.S. Cl.
CPC .................. *H02J 3/38* (2013.01); *H02J 3/18* (2013.01); *H02M 7/44* (2013.01); *Y02E 40/30* (2013.01); *Y10T 307/707* (2015.04)

(58) Field of Classification Search
CPC .................. H02J 3/38; H02J 3/18; H02M 7/44
(Continued)

(56) References Cited

U.S. PATENT DOCUMENTS 7,606,638 B2    10/2009   Fortmann et al.
2008/0073912 A1*  3/2008  Fortmann ............. H02J 3/1885
                                                    290/44

(Continued)

FOREIGN PATENT DOCUMENTS

DE    102010006142 A1    8/2011
WO    2008128680 A2      10/2008

OTHER PUBLICATIONS

International Search Report dated Sep. 23, 2013 for international application No. PCT?EP2013/062760.

(Continued)

*Primary Examiner* — Thomas Skibinski
(74) *Attorney, Agent, or Firm* — Eschweiler & Potashnik, LLC (57) ABSTRACT

In order to control a plurality of inverters, which are connected on their input side to a current source each and on their output side to a common grid connection point, electrical variables are measured at the individual inverters and are used for controlling the individual inverters, currents being output by the individual inverters depending on the electrical variables measured at the location of the individual inverters Effects of the connection equipment between the individual inverters and the common grid connection point on currents are determined, electrical variables being measured at the grid connection point and are set in relation to the electrical variables measured at the same time at the individual inverters. The connection equipment between the (Continued)

individual inverters and the common grid connection point is taken into consideration in controlling the individual inverters.

15 Claims, 4 Drawing Sheets

(51) Int. Cl.
*H02J 3/18* (2006.01)
*H02M 7/44* (2006.01)

(58) Field of Classification Search
USPC ......... 307/82–87, 43–48, 52, 60, 69, 72–76; 700/287
See application file for complete search history.

(56) References Cited

U.S. PATENT DOCUMENTS

2008/0278000 A1* 11/2008 Capp .................. H02J 3/04 307/21
2010/0332042 A1 12/2010 Riesberg et al.
2011/0103110 A1* 5/2011 Godridge ............ H02J 3/386 363/74

OTHER PUBLICATIONS

English language summary of Explanations in respect of provisions set by EnBW Regional AG for the reactive power/voltage characteristic Q(U) for generation plants on the medium-voltage grid. Aug. 2011.

* cited by examiner

CONTROL OF A PLURALITY OF INVERTERS CONNECTED TO A COMMON GRID CONNECTION POINT

CROSS REFERENCE TO RELATED APPLICATIONS

This application is a continuation of German application number 10 2012 105 721.4, filed on Jun. 28, 2012, which claims priority to International application number PCT/EP2013/062760, filed on Jun. 19, 2013.

FIELD

The present disclosure relates to a method of controlling a plurality of inverters, which are connected to a current source each on their input side and to a common grid connection point on their output side.

More specifically, the present disclosure relates to a method in which electrical variables are measured at the individual inverters and are used for controlling the individual inverters, wherein connection equipment between the individual inverters and the common grid connection point is taken into consideration.

BACKGROUND

Operators of decentralized energy generation plants which feed electrical energy into a public electricity grid at a grid connection point generally have to adhere to provisions set by the grid operator during feeding, namely at the grid connection point. Thus, it is in particular not sufficient to fulfill these provisions, for example in respect of the reactive power to be fed in order to stabilize the grid voltage, at the output of one or more inverters of the respective energy generation plant because this is in no way equivalent to the provisions also being met at the grid connection point. Reasons for this are, for example, mutual influencing of the individual inverters and in particular the effects of connection equipment, which connects the individual inverters to the grid connection point and therefore also to one another. The connection equipment can have very different properties for different inverters of an energy generation plant, for example when the connection equipment connects inverters which are distributed far apart from one another, as usual in photovoltaic systems, to one another and to the grid connection point.

The mutual influencing of inverters can gain increased importance in particular when the inverters and/or the current sources connected thereto vary to a greater extent. In this case, a current source in the form of a generator, on the one hand, and a current source in the form of a storage system for electrical energy, on the other hand, in which the connected inverter can not only output current but can also draw current, is only one example of such a variance.

It is known from "Erläuterungen zu den Vorgaben der EnBW Regional AG zur Blindleistungs-Spannungskennlinie Q(U) für Erzeugungsanlagen am Mittelspannungsnetz (Stand 08/2011)" [Explanations in respect of provisions set by EnBW Regional AG for the reactive power/voltage characteristic Q(U) for generation plants on the medium-voltage grid (version 08/2011)] that when a Q(U) characteristic is required which needs to be realized at the grid connection point, the connection equipment between the inverters and the grid connection point needs to be taken into consideration. For this purpose, two concepts are described. The first is based on measurements at the grid connection point and the inclusion of all of the inverters in a control loop. The other is based on a projection of the inverters onto the grid connection point. For this purpose, an equivalent circuit diagram of the respective connection equipment is stored in the individual inverters and is used for such modification of the control curves of the inverters that the effect of the respective connection equipment up to the grid connection point is compensated for. The inclusion of all of the inverters in a control loop requires quick communication links to the grid connection point and all of the inverters when presets are intended to be precisely adhered to at the grid connection point. The projection of the individual inverters onto the grid connection point requires detailed information on all components parts of the connection equipment and the interconnection of said component parts, for this purpose.

DE 10 2010 006 142 A1 discloses an energy portal for controlling or regulating an energy feed from a generation unit grid into an energy distribution grid. The energy portal comprises an operational parameter control apparatus for controlling or regulating operational parameters of the generation unit grid on the basis of evaluated measured variables, feed factors and prognosis information with the feed factors as a controlled variable. The operational parameter control apparatus can be designed for dynamic control or regulation of reactive power compensation on the basis of measured variables with respect to reactive power of the generation unit grid.

DE 10 2009 030 725 A1 discloses a wind farm comprising a multiplicity of wind turbines, whose generated electrical energy is transferred to an electricity grid at a connection point. The public electricity grid presets setpoint values for the connection point, and a sensor measures actual electrical values at the connection point. A master controller determines a preset for a second control layer on the basis of a difference between upper setpoint values and upper actual values on a first control layer. A plurality of submaster controllers on the second control layer takes the presets as lower setpoint values and makes presets for the wind turbines on the basis of a difference between the lower setpoint value and a lower actual value. Over all control layers there is a closed control loop between the connection point and the wind turbines, with the fault-free operation of said closed loop being dependent on the fact that the correct actual values are supplied to the control modules. The actual values can be measured directly or calculated at least partially from measured values at other points, for example the actual value relevant for one of the submaster controllers from the actual values of the wind turbines assigned thereto. For the stability of such control which is nested in the form of a cascade, it is considered advantageous if the lower control layers each have a smaller time constant than the upper control layers. The submaster controller takes into consideration the fact that the wind turbines are arranged at different distances from the connection point in its presets to the wind turbines for the provision of a quantity of reactive power and matches the presets to the wind turbines correspondingly. In the known wind farm, control modules are provided which can optionally be used as master controller or submaster controller.

There still is a need of a method for controlling a plurality of inverters, which are connected to a current source each on their input side and to a common grid connection point on their output side, by which method presettings at the grid connection point can be adhered to precisely even in case of complex connection equipment, but which method can be implemented without excessive complexity being involved.

SUMMARY

The present disclosure provides a method of controlling a plurality of inverters, which are connected to a current source each on their input side and to a common grid connection point on their output side. In the method, electrical variables are measured at the individual inverters and are used for controlling the individual inverters, currents being output by the individual inverters depending on the electrical variables measured at the location of the individual inverters. Effects of connection equipment between the individual inverters and the common grid connection point on currents output by the individual inverters are determined, electrical variables being measured at the grid connection point and are set in relation to the electrical variables measured at the same time at the individual inverters. The connection equipment between the individual inverters and the common grid connection point is taken into consideration in controlling the individual inverters.

Other features and advantages of the present disclosure will become apparent to one with skill in the art upon examination of the following drawings and the detailed description. It is intended that all such additional features and advantages be included herein within the scope of the present disclosure, as defined by the claims.

BRIEF DESCRIPTION OF THE DRAWINGS

The present disclosure can be better understood with reference to the following drawings. The components in the drawings are not necessarily to scale, emphasis instead being placed upon clearly illustrating the principles of the present disclosure. In the drawings, like reference numerals designate corresponding parts throughout the several views.

DETAILED DESCRIPTION

In a method according to the present disclosure for controlling a plurality of inverters, which are connected to a current source each on their input side and to a common grid connection point on their output side, in which method electrical variables are measured at the individual inverters and are used for controlling the individual inverters, the effects of connection equipment between the individual inverters and the common grid connection point on currents output by the individual inverters are determined, wherein the currents are output by the individual inverters depending on the electrical variables measured at the location of the individual inverters. For this purpose, electrical variables are measured at the grid connection point and are set in relation to the electrical variables measured at the same time at the individual inverters. From these relationships, it is derived in what way the connection equipment needs to be taken into consideration in the control of the individual inverters. Ideally, the consideration is then effected in such a way that the individual inverters, including their connection equipment, each behave as though the inverters are connected directly, i.e. without interposed connection equipment, to the grid connection point.

The current sources connected to the individual inverters can be of quite different types. They may in particular be generators, such as, for example, photovoltaic generators, or electric machines, which are driven by windwheels or internal combustion engines, or fuel cells. Furthermore, the current sources may comprise storage systems for electrical energy, in particular batteries and electric machines which are driven by flywheel masses, in particular flywheels, and combinations of hydrogen stores and reversible fuel cells or with additional hydrolyzers.

A current source connected to an inverter may also comprise a plurality of subgenerators or substores for electrical energy which are connected in parallel or in series, as is not unconventional, for example, in the case of a photovoltaic generator having a plurality of modules connected in series with substrings and a plurality of substrings connected in parallel.

In the method according to the present disclosure, no attempt is made to detect the respective connection equipment in terms of all of its component parts and all of the details of the interconnections thereof. Rather, the method according to the present disclosure concentrates on detecting the effects of the connection equipment in order to compensate for these effects in the control of the individual inverters. In other words, the control of the individual inverters is calibrated in the method according to the present disclosure in such a way that the individual inverters demonstrate a desired behavior in relation to the grid connection point.

Useful measurement of the connection equipment, i.e. also useful compensation of this connection equipment or useful calibration of the control systems of the individual inverters, presupposes more than measurement of the effects of the connection equipment only at certain points. Instead, these effects shall be detected over the entire potential operating ranges of the individual inverters. For this purpose, these operating ranges of the individual inverters are covered as completely as possible during measurement of the effects of the connection equipment.

This coverage of the operating ranges of the inverters can theoretically take place by virtue of there being a sufficiently long wait time until the inverters have reached all possible operating points once. In one example, however, during the measurement of the effects of the connection equipment in each case at least one inverter is controlled depending on at least one other variable external variable other than the electrical variables measured at the location of the individual inverters in order to necessarily cover the operating range of said inverter during measurement of the effects of the connection equipment. In this way, the measurement of the connection equipment is considerably shortened.

This measurement takes place particularly effectively when the individual inverters are operated in the meantime in accordance with a preset measurement program. With such a measurement program, not only all operating points of the individual inverters which should be covered for complete detection of the effects of the connection equipment over their operating ranges can be approached, but it is also possible to approach in a targeted manner other operating point configurations of different inverters relative to one another which can influence the effects of the connection equipment of the individual inverters.

Specifically, the measurement program can vary the control of the individual inverters as a function of the electrical variables measured at the location of the individual inverters. In this way, not only different operating points of the individual inverters are approached, but it is also possible to determine directly by trial and error such variation of the control of the individual inverter, which ensures that said inverter, including its connection equipment, behaves as though it were connected directly to the grid connection point without any connection equipment. In order to be able to assign the variations in the measured electrical variables at the grid connection point to a specific variation in the control of a specific inverter during this trial and error process, it is desirable if, in accordance with the measurement program, the control of the individual inverters is varied separately from one another. That is to say that there is only ever interventions so as to change the control of an inverter, while the controls of all of the other inverters remain unchanged. In order that the effects of the connection equipment of the other inverters are mapped in a manner which is as close to reality as possible, however, it is expedient to operate the respective other inverters, in which the control is not being varied at that time, at or close to their operating point in the case of the present measured values.

Even the external electrical variables which are not determined by the inverters can be varied in accordance with the measurement program by virtue of, for example, the grid connection point for the measurement of the effects of the connection equipment not being connected to a public electricity grid, into which electrical energy is usually fed by the inverters, but to a variable consumer or else to a public electricity grid via a variable AC-to-AC converter. With the variable consumer or the variable AC-to-AC converter, external electrical variables as are otherwise given by the public electricity grid can then be simulated for the measurement of the effects of the connection equipment.

In a specific embodiment of the method according to the present disclosure, control curves, which are used in the control of the individual inverters and are depending on the electrical variables measured at the location of the individual inverters, are modified as a function of at least one electrical variable measured at the location of the individual inverters in order to take into consideration the associated connection equipment. In particular, this electrical variable which is additionally taken into consideration is an internal electrical variable of the respective inverter. Thus, the active power presently output by the inverter can be used as argument for a correction function, with which a control curve is modified, in order to compensate for ohmic ($I^2R$) losses owing to the connection equipment, for example. Further influences of the connection equipment can also be compensated for by a correction performed depending on the presently fed active power of the individual inverters. This applies, for example, to control curves which are used in the control of the individual inverters for outputting reactive power as a function of the externally applied voltage or for outputting active power as a function of the frequency of the externally applied voltage.

In the ideal case, the control curves of each individual inverter are modified in such a way that the effects of its connection equipment are compensated for. Since the effects of the individual connection equipment in the case of an energy generation plant with a large number of inverters which are physically distributed from one another are often very different, this means that very different variations in the control curves also take place.

However, it is not always sensible to attempt to achieve complete compensation of the connection equipment in all inverters, i.e. to operate all inverters, including their connection equipment, effectively as though the inverters were connected directly to the grid connection point without any connection equipment. Instead, it may be sensible, owing to very different connection equipment, to realize a desired characteristic behavior only over the entirety of the inverters. Thus, inverters which have a higher impedance for certain electrical variables than others can be factored out in the provision of these electrical variables. This applies, for example, to the provision of reactive power by inverters which are arranged very far away from the grid connection point with correspondingly long connection equipment.

Limited line cross sections over which a plurality of inverters are combined to form groups can also make it expedient to provide a desired characteristic behavior which is not common to all inverters, but only to selected inverters. These selected inverters then need to be controlled by correspondingly steeper control curves, however, since they need to provide the effect for the inverters which are not actuated with this dependency as well. This concept can also be described such that the control curves used in the control of the individual inverters are modified in order to perform demanded changes to feed parameters at the grid connection point, which may be recognized by changing electrical variables measured at the individual inverters, selectively by means of those inverters with which these feed parameters are changeable with the highest total efficiency taking into account the effects of the connection equipment.

The measurement according to the present disclosure of the connection equipment with respect to their effects on the currents output by the individual inverters up to the grid connection point can take place once, and corresponding apparatus can then be removed. This is particularly expedient when the measurement of the electrical variables at the grid connection point takes place on the secondary side of a transformer, i.e. for example at a medium-voltage level, since the apparatus to be used there is admittedly considerably more complex and expensive than on the primary side, i.e. at a low-voltage level, on the one hand, but on the other hand enables direct measurement of the effects of the transformer as well. Strictly speaking, the connection equipment only needs to be measured again when the connection equipment and/or one or more of the inverters and/or one or more of the current sources connected to the inverters have been changed. However, it may be quite expedient for a calibration device to be permanently available in order to update the calibration continuously, even if at a much lower clock-pulse rate than that at which the control systems of the individual inverters operate.

The current sources connected to individual inverters can be not only simply generators, such as PV generators or electric machines with connected windwheels or internal combustion engines or fuel cells, for example, but they may also be storage systems for electrical energy. These include, for example, batteries or electric machines with connected flywheel masses or hydrogen stores with reversible fuel cells and with combinations of fuel cells and hydrolyzers. Furthermore, a storage system for electrical energy can also be in the form of a large electrical capacitance. It goes without saying that when the current sources also comprise storage systems for electrical energy, the operating ranges thereof which need to be taken into consideration during the measurement of the connection equipment also include the cases in which the storage systems draw electrical energy.

Figure 1:
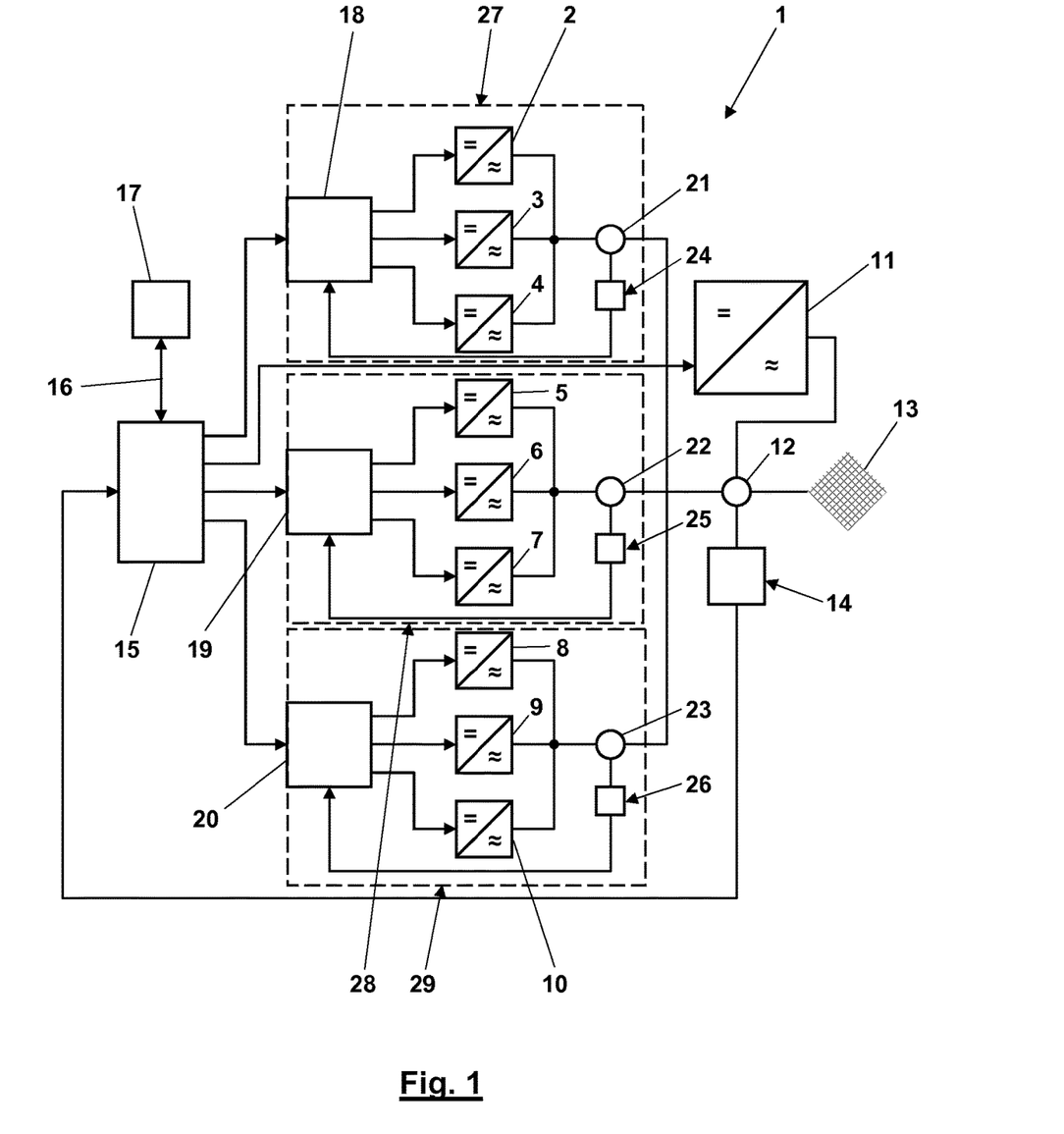
FIG. 1 shows a schematic illustration of an energy generation plant comprising a plurality of inverters.

Referring now in greater detail to the drawings, the energy generation plant 1 illustrated in FIG. 1 comprises a plurality of inverters 2 to 11, which are connected to an AC grid 13 via a common grid connection point 12. Measuring devices 14 which are not further differentiated here in the drawing are provided in order to measure electrical variables of a collective total current output of all of the inverters 2 to 11 at the grid connection point 12, wherein this measurement can take place on the primary side and/or secondary side of a transformer if there is such a transformer at the grid connection point 12. In particular, this may be the current which is flowing via the grid connection point, the grid voltage, the phase angle between the current and the voltage and/or the frequency of the AC grid 13. Alternatively, other electrical variables which contain corresponding information can also be measured. The electrical variables measured by the measuring devices 14 are available to a main control device 15 of the energy generation plant. The main control device 15 compares these electrical variables with presets for the collective total current output via the grid connection point 12. These presets can in particular include presets for the active power P, the reactive power Q, the phase angle cos φ and/or the asymmetry of the feed current and can be derived from the electrical variables themselves by the main control device 15 by means of preset functional relationships. Alternatively, the presets can be communicated to said main control device via a data communications link 16 from an external point, in particular from a grid operator 17 that is operating the AC grid 13. In order to implement the presets for the collective total current output, the main control device 15 firstly intervenes in group control devices 18 to 20 to which in each case a plurality of inverters 2 to 4, 5 to 7 and 8 to 10 are assigned, respectively, and secondly directly in a control device of the inverter 11 (not illustrated separately in the drawings here). The group control devices 18 to 20 obtain a preset for a collective group current output of its inverters at the grid connection point 12 or a respective group connection point 21, 22 or 23 from the main control device 15, for example. Electrical variables of the group current output at the respective group connection point 21 to 23 are measured using measuring devices 24 to 26, which are located on the primary side and/or secondary side of a transformer which may be provided at the respective group connection point 21 to 23 and are available to the respective group control device 18 to 20.

In order that the group current outputs correspond to the presets of the main control device 15, the group control devices 18 to 20 intervene in control devices (not illustrated separately here) of the inverters 2 to 10. During this procedure, the main control device 15 can consider any group 27 to 29 of inverters 2 to 4, 5 to 7 or 8 to 10 with the associated group control device 18, 19 or 20 and all of the further components contained in each case within a box bordered by a dashed line to be a functional unit, of which only the collective properties, for example in the form of a group collective function model need to be known. Conversely, it is also possible for the main control device 15 to intervene directly only in the group control devices 18 to 20 in order to influence the group current outputs at the group connection points 21 to 23 but to make direct presets for the individual inverters 2 to 10, which now only need to be implemented by the group control devices 18 to 20. In this case, an overall model of the energy generation plant 1 can then be used, which overall model is available to the main control device 15 and describes all of the components in the energy generation plant 1 which have an effect on the collective total current output at the grid connection point 12. There are corresponding possible variation means in the area of the individual groups 27 to 29. The group control devices 18 to 20 can take into consideration the individual inverters 2 to 10 including connected current sources, connection equipment between the inverters and the group connection point 21 or the grid connection point 12 and including the control devices thereof as functional units and take into consideration all of the mentioned components separately.

FIG. 1 illustrates the inverters 2 to 4, 5 to 7 and 8 to 10 in each group 27 to 29 equally, to be precise both in respect of their number within the respective group 27 to 29 and with respect to their formation within the group and over all groups 27 to 29. However, it should be emphasized that the number of inverters in the individual groups can vary significantly and that although in principle identical inverters can be combined in the groups 27 to 29, the inverters in each group can also be different. Specifically, both inverters with current sources in the form of simple generators and inverters with current sources in the form of storage systems for electrical energy can be provided in each group. Thus, for example, electrical energy from PV generators as current sources of some inverters in a group which is not constantly available can be buffer-stored in batteries or other storage systems for electrical energy of other inverters in the group. In the ideal case, therefore, electrical energy for current output at the grid connection point 12 is always available to a defined extent from each group 27 to 29. In order to achieve this aim, in addition to generators which use a source of regenerative energy, other generators which use fossil fuel energy sources with an internal combustion engine, for example, can also be used. Likewise, in addition to batteries for a medium-term to long-term storage of electrical energy, capacitors or flywheel masses connected to electric machines can also be used for shorter-term storage of electrical energy. For longer-term buffer-storage of electrical energy, reversible fuel cell systems which buffer-store electrical energy in the form of hydrogen can also be used.

The inverter 11 which is not assigned to any group control device shown in FIG. 1 represents, by way of example, a large energy generation unit which can be connected directly to the grid connection point 12 in order to, in the short term, react to critical grid events and/or compensate for fluctuations in the collective total current output of the groups 27 to 29. This may be, for example, an inverter which can call up a high active power and/or reactive power for a short period of time from a large capacitance or a flywheel mass store or which is connected to a large battery as a current source or an inverter whose current source has an electric machine with a connected internal combustion engine in the form of a large diesel engine.

During operation of the energy generation plant 1 shown in FIG. 1, any model used is regularly checked and, if appropriate, updated on the basis of the electrical variables detected by the measuring devices 14 and 24 to 26. As long as the models used are kept up to date in this way, they make it possible for the main control device 15 or group control device 18 to 20 using them to ensure that the respective preset for the collective total current output at the grid connection point 12 or the group current outputs is met in accordance with the concept of feedforward control. Even when, in the process, monitoring of the actually achieved result takes place, this monitoring can therefore remain comparatively slow without there being the risk of the electrical variables of the respective current output deviating to a greater extent in the meantime. Within the subordinate functional units, i.e. the groups 27 to 29 or the inverters 2 to 10, however, it may be expedient to perform the control and also matching of the control at a much higher clock-pulse rate. This applies in particular when the current sources of the inverters are those in which, as in the case of PV generators, even short-term considerable fluctuations in the electrical energy available cannot be avoided in principle.

Figure 2:
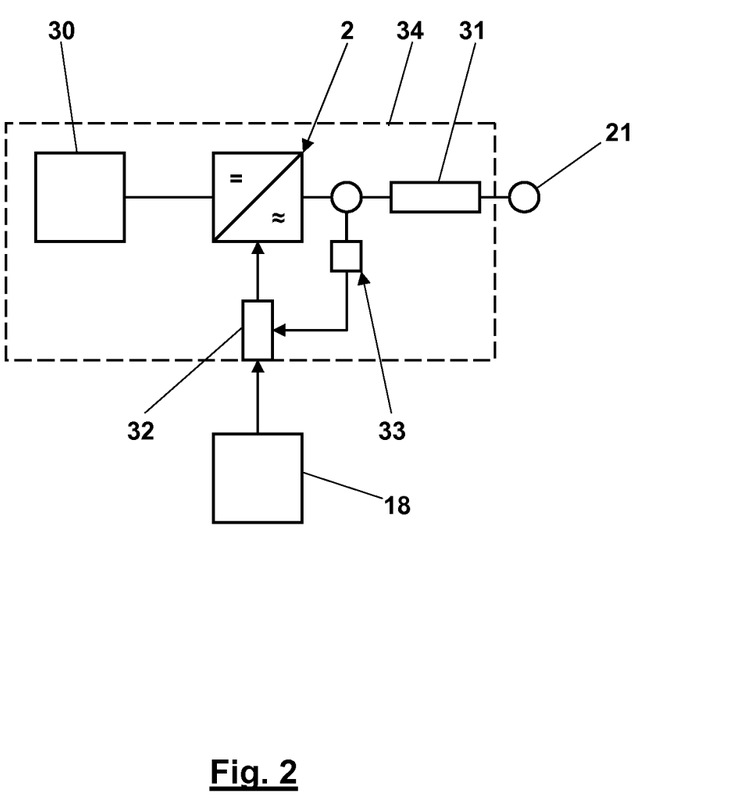
FIG. 2 shows a more complete schematic illustration of the functional environment of an inverter of the energy generation plant according to in FIG. 1.

FIG. 2 shows, by way of example, the inverter 2 shown in FIG. 1 together with its associated components which have an influence on its current output to the group connection point 21 and are not illustrated separately in FIG. 1. These include the current source 30, to which the inverter 2 is connected on the input side, the connection equipment 31 which connects the inverter to the group connection point 21, the control device 32 of the inverter and measuring devices 33 for electrical variables of a current output of the inverter 2 at its output. The group control device 18 can take into consideration the inverter 2 including these and other factors affecting the current output of the inverter 2 as a functional unit 34 and not continue to take it into consideration beyond an individual functional model of this functional unit 34. Conversely, the group control unit 18 can itself be responsible for taking into consideration said components and issue control commands to the control device 32, which are implemented directly by said control device.

Figure 3:
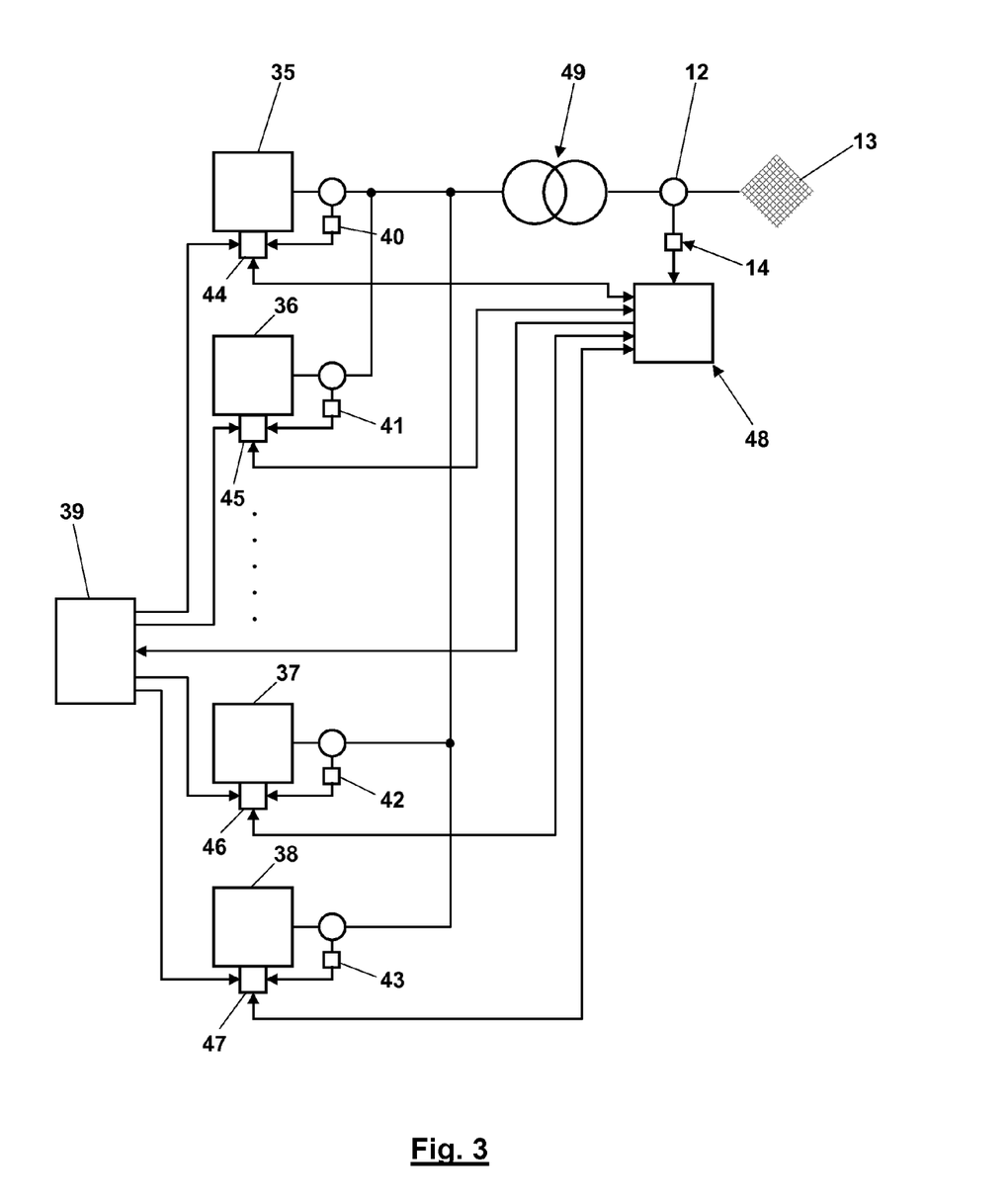
FIG. 3 illustrates a measurement setup for a calibration method according to the present disclosure which is performed on a plurality of energy generation units which are connected to a common grid connection point.

The properties of the connection equipment via which the individual inverters 2 to 11 are connected to the grid connection point 12 and possibly to the group connection points 21 to 23 can be theoretically modeled, i.e. calculated, on the basis of the individual components of this connection equipment. Frequently, not all details of the connection equipment in respect of the components of said connection equipment are entirely known, however, or said connection equipment can only be modeled theoretically with difficulty or not at all owing to a large number of components and interlinking or interconnection thereof, which can also be a consequence of the large number of inverters connected to one another via the connection equipment which influence one another. In order nevertheless to be able to exert influence on the collective total current output at the grid connection point 12 shown in FIG. 1 with presets for the current outputs of the individual inverters or else with presets for the group current outputs of the groups of these inverters in a defined manner, calibration can be performed, for which a measurement setup is illustrated in FIG. 3. FIG. 3 shows a plurality of energy generation units 35 to 38, which are connected to the AC grid 13 via the common grid connection point 12. The energy generation units 35 to 38 can be inverters 2 to 11 or groups of inverters 27 to 29, as shown in FIG. 1, and they can be assigned to a superordinate control device 39, i.e. one of the group control devices 18 to 20 or the main control device 15 shown in FIG. 1. Each energy generation unit 35 to 38 has measuring devices 40 to 43 for its current output and a control device 44 to 47. A calibration device 48 is temporarily provided for the calibration of the connection equipment of the energy generation units 35 to 38, or such a calibration device is provided permanently in order to enable regular recalibration as well. A transformer 49 is illustrated in FIG. 3 as an example of a component of the connection equipment of the energy generation units 35 to 38 at the grid connection point 12 which contributes to the complexity thereof.

The calibration device 48 detects the electrical variables of the collective total current output at the grid connection point 12 via the measuring devices 14 and adjusts them by the electrical variables of the current outputs of the individual energy generation unit 35 to 38 measured by the measuring devices 40 to 43. In order to be able to resolve the effect of the connection equipment of individual energy generation units 35 to 38, the calibration apparatus 48 intervenes in the control devices 44 to 47 either directly or via the superordinate control device 39. Thus, it can affect defined modulation of the operation of one of the energy generation units 35 to 38, for example, while the operation of the other energy generation units remains constant. It goes without saying that the corresponding method steps are implemented for each of the energy generation units 35 to 38. In addition, the calibration device 48 can actuate the energy generation units 35 to 38 in a targeted manner in respect of different electrical variables for their current outputs, to be precise both collectively and individually, in order to take into consideration all operating states which may occur in the collective of energy generation units 35 to 38. The calibration device 48 derives models of the connection equipment of the individual energy generation units at the grid connection point 12 from the measured values obtained in this way, which models can be communicated to the control devices 44 to 47 or the superordinate control device 39 in order that they can be taken into consideration there in the future.

Figure 4:
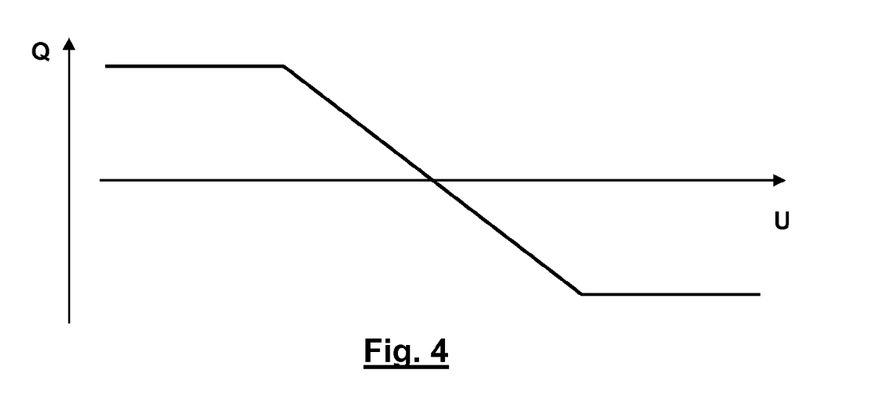
FIG. 4 shows a Q(U) characteristic of one of the energy generation units shown in FIG. 3.
Figure 5:
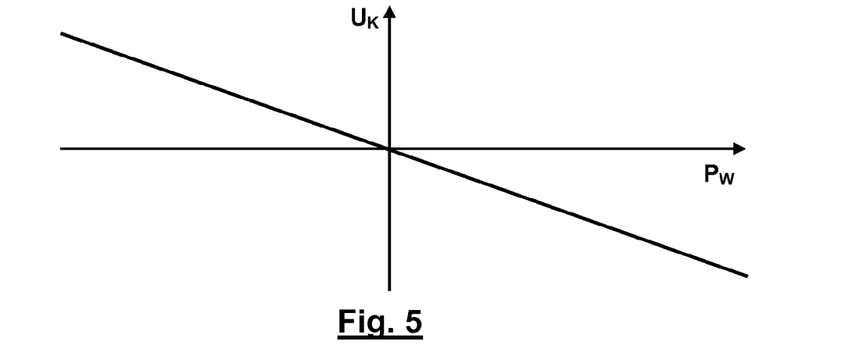
FIG. 5 shows a correction voltage which is a function of the active power of the respective energy generation unit for the application of the characteristic shown in FIG. 4.

One possibility of implementing the calibration as shown in FIG. 3 in the control devices 44 to 47 of the energy generation units 35 to 38 is explained with reference to FIGS. 4 to 6 below. It is a known measure for supporting the voltage in AC grids that connected energy generation plants feed reactive power Q as a function of the grid voltage U present at the grid connection point of said energy generation plants. FIG. 4 shows a corresponding Q(U) characteristic, where Q is a relative reactive power component of the fed power and U is the grid voltage in working units. If the total current output at the grid connection point is intended to follow this characteristic, it is not sufficient, owing to the properties of the connection equipment of the individual energy generation units at the grid connection point, to implement this characteristic into the energy generation units without matching. Instead, the characteristic in each energy generation unit needs to be calibrated in order to take into account the connection equipment of the respective energy generation unit. This calibration at least consists in the consideration of a correction voltage $U_K$, which is a function of the active power $P_W$ fed by the respective energy generation unit, wherein frequently a linear functional dependency can be used, as is illustrated in FIG. 5. This correction voltage $U_K$ in essence takes into consideration voltage drops between the respective energy generation unit and the grid connection point owing to ohmic resistances.

Figure 6:
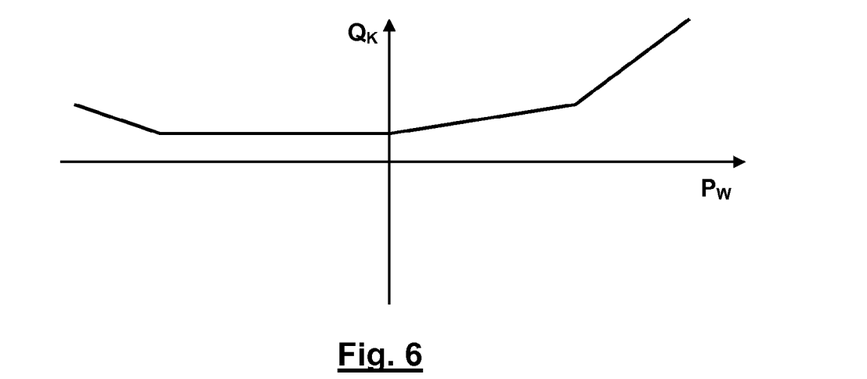
FIG. 6 shows an additional correction reactive power which is a function of the active power of the respective energy generation unit and which likewise needs to be taken into consideration in the implementation of the characteristic according to in FIG. 4 in a control curve.

Furthermore, it has proven to be expedient to correct the characteristic shown in FIG. 4 by a correction reactive power $Q_K$ which is a function of the fed active power $P_W$ as well, for which a possible profile, determined by different supporting values, is illustrated in FIG. 6. Further corrections may be necessary for completely taking into consideration the respective connection equipment. The calibration of the characteristic shown in FIG. 4 for compensating for the connection equipment of the respective energy generation unit results in the respective energy generation unit no longer being able to be actuated with the aid of a steady-state control curve which reflects a fixed characteristic. Instead, the different corrections necessary in a two-dimensional illustration result in a bundle of characteristics or a two-dimensional or multidimensional control area extending through a three-dimensional of multidimensional space. In practice, however, the control curve control of the energy generation units can be maintained when the input and output values of the control curve are additionally modified if modification of the two-dimensional profile of the control curve on its own is insufficient.

Many variations and modifications may be made to the preferred embodiments of this disclosure without departing substantially from the spirit and principles of this disclosure. All such modifications and variations are intended to be included herein within the scope of the present disclosure, as defined by the following claims.

The invention claimed is:

1. A method of controlling a plurality of inverters, which are connected to a current source each on their input side and to a common grid connection point on their output side, comprising:
    measuring electrical variables at the individual inverters and using the measured electrical variable to control the individual inverters, wherein currents are output by the individual inverters depending on the electrical variables measured at the individual inverters;
    determining effects of connection equipment between the individual inverters and the common grid connection point on currents output by the individual inverters, wherein the determining comprises operating the inverters in accordance with a preset measurement program; and
    measuring electrical variables at the grid connection point and setting the electrical variables at the grid connection point in relation to the electrical variables measured at the same time at the individual inverters,
    wherein the determined effects of the connection equipment between the individual inverters and the common grid connection point are taken into consideration in controlling the individual inverters,
    wherein operating the inverters in accordance with the preset measurement program comprises varying the control of the individual inverters depending on the electrical variables measured at the individual inverters.

2. The method of claim 1, wherein determining the effects of the connection equipment comprises covering potential operating ranges of the inverters.

3. The method of claim 1, wherein determining the effects of the connection equipment comprises controlling at least one of the plurality of inverters depending on at least one external variable other than the electrical variables measured at the location of the individual inverters.

4. The method of claim 1, wherein operating the inverters in accordance with the preset measurement program comprises varying the control of the individual inverters separately from one another depending on electrical variables measured at the location of the individual inverters.

5. The method of claim 4, wherein the respective other inverters in which the control is not being varied at that time are operated at or close to their normal operating point in the case of the present measured values.

6. The method of claim 1, further comprising modifying control curves, which are used in controlling the individual inverters and which are depending on the electrical variables measured at the location of the individual inverters, as a function of at least one electrical variable measured at the individual inverters in order to take the associated connection equipment into consideration.

7. The method of claim 6, wherein control curves used in controlling the individual inverters are modified as a function of at least one internal electrical variable of the respective inverter in order to take the associated connection equipment into consideration.

8. The method of claim 7, wherein control curves which are used in controlling the individual inverters for outputting reactive power as a function of an externally applied voltage or for outputting active power as a function of a frequency of the voltage applied externally, are modified depending on the active power fed by the respective inverter in order to take the associated connection equipment into consideration.

9. The method of claim 6, wherein the control curves used in controlling the individual inverters are modified in order to individually compensate for the effects of the connection equipment of the individual inverter.

10. The method of claim 6, wherein the control curves used in controlling the individual inverters are modified in order to make changes to feed parameters at the grid connection point as demanded by changing external electrical variables measured at the individual inverters selectively by means of such inverters, which are configured to change these feed parameters with the highest total efficiency in respect of the effects of the connection equipment.

11. The method of claim 10, wherein the changes to feed parameters at the grid connection point are only performed by those inverters which are configured to change these feed parameters with the highest total efficiency in respect of the effects of the connection equipment.

12. The method of claim 1, further comprising measuring the connection equipment again only when the connection equipment and/or one or more of the inverters and/or one or more of the current sources connected to the inverters has been changed.

13. The method of claim 1, wherein the electrical variables are measured at the grid connection point on a secondary side of a transformer connecting the inverters to an AC grid.

14. The method of claim 1, wherein the current sources connected to the inverters comprise PV generators or electric machines with connected windwheels or internal combustion engines or fuel cells, and storage systems for electrical energy.

15. The method of claim 14, wherein the current sources connected to the inverters comprise batteries or electric machines with connected flywheel masses or hydrogen stores with reversible fuel cells or with combinations of fuel cells and hydrolyzers.

* * * * *